United States Patent
Gardner et al.

(10) Patent No.: US 9,532,117 B1
(45) Date of Patent: Dec. 27, 2016

(54) SYSTEM AND METHOD FOR IDENTIFYING ORPHANED UTILITY METERS

(71) Applicant: ORACLE INTERNATIONAL CORPORATION, Redwood Shores, CA (US)

(72) Inventors: Max A. Gardner, Oakland, CA (US); Kevin V. Li, Oakland, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/826,448

(22) Filed: Aug. 14, 2015

(51) Int. Cl.
*G08B 23/00* (2006.01)
*H04Q 9/00* (2006.01)

(52) U.S. Cl.
CPC ........... *H04Q 9/00* (2013.01); *H04Q 2209/60* (2013.01)

(58) Field of Classification Search
None
See application file for complete search history.

(56) References Cited

U.S. PATENT DOCUMENTS

| | | | | |
|---|---|---|---|---|
| 7,769,888 | B2* | 8/2010 | Flammer | H04L 45/00 340/870.01 |
| 2007/0120705 | A1* | 5/2007 | Kiiskila | G01D 5/00 340/870.02 |
| 2011/0140910 | A1* | 6/2011 | Olson | G01D 4/004 340/870.02 |
| 2012/0047558 | A1* | 2/2012 | Sundaram | H04L 63/0869 726/3 |
| 2012/0083937 | A1* | 4/2012 | Kong | G06Q 50/06 700/295 |
| 2012/0268291 | A1* | 10/2012 | Boot | H04L 45/30 340/870.03 |
| 2013/0009787 | A1* | 1/2013 | Ree | G01D 4/002 340/870.02 |
| 2014/0072059 | A1* | 3/2014 | Krishnan | G01D 4/002 375/257 |

* cited by examiner

*Primary Examiner* — Curtis King
(74) *Attorney, Agent, or Firm* — Kraguljac Law Group, LLC

(57) ABSTRACT

Systems, methods, and other embodiments associated with recovering orphaned utility meters are described. In one embodiment, a method includes selecting, from an electronic database, a plurality of candidate meters that are located proximate to an orphaned meter as determined based, at least in part, on ping information received from the orphaned meter. The orphaned meter is a utility meter that is actively transmitting the ping information to a utility company and is not associated with a customer account. The example method may also include evaluating the plurality of candidate meters according to the ping information to generate comparative metrics that define similarities between the orphaned meter and each of the plurality of candidate meters to identify whether one or more of the plurality of candidate meters correlate with the orphaned meter. The method also includes generating an electronic output based, at least in part, on the comparative metrics.

20 Claims, 3 Drawing Sheets

SYSTEM AND METHOD FOR IDENTIFYING ORPHANED UTILITY METERS

BACKGROUND

A utility distribution system is a complex system of many different components that work together to distribute a particular resource (e.g., electricity, gas, water). In general, the distribution system for a utility may include a generation point/intake, various transmission/distribution components, and utility meters at each point of use. Accordingly, tracking physical components and connections between the physical components within the utility distribution system can be difficult. When tracking utility meters, the utility company may, for example, maintain electronic records that specify information about locations of the utility meters and associated customer accounts. However, the records are generally prone to including incorrect information because of user errors.

For example, when a utility meter is originally installed or swapped for an old meter, a utility worker is responsible for updating the electronic records to properly reflect where the utility meter is located. When the electronic records are properly maintained, a customer account is linked to the utility meter and charged for consumption logged by the utility meter. However, sometimes the utility worker misconfigures the utility meter causing an associated electronic record to incorrectly identify the utility meter. As a result, the old meter may remain associated with the user account while not reporting any consumption because the old meter has been removed. Additionally, the new meter may record consumption that is not billed because the new meter is not associated with the customer account.

A utility meter that is not associated with a customer account is referred to as an orphaned meter. Orphaned meters are associated with lost revenues from unbillable consumption along with costs of lost equipment in the orphaned meters themselves. Furthermore, searching for orphaned meters is generally accomplished by manually performing onsite surveys. This process is tedious and time consuming while also being prone to manual entry errors. Accordingly, difficulties exist with ensuring accuracy of the electronic records and identifying locations of orphaned meters.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems, methods and other embodiments are described herein that provide for recovering orphaned utility meters. A utility meter that is not associated with a customer account because of a mis-configured electronic record is referred to as an orphaned meter. In general, the orphaned meter is "misplaced" because an associated customer address for which the orphaned meter is monitoring consumption is unknown.

In one embodiment, a system uses ping information communicated by an orphaned meter to identify a mis-configured electronic record in order to recover the orphaned meter including reconfiguring the electronic record. Consider that even though an orphaned meter is not properly associated with a customer account, the orphaned meter still transmits ping information to the utility company via network communications. This is because the orphaned meter is connected to the utility network, communicating on the network, and metering consumption, but an associated electronic record is simply mis-configured.

Furthermore, while the orphaned meter is not properly associated with a customer account, another utility meter may still be linked to the customer account. However, the other utility meter is, for example, not likely reporting any data because when the orphaned meter was installed the other utility meter was likely removed or swapped out. Accordingly, in one embodiment, the system is configured to analyze information from a utility database about various customer accounts and associated meters in light of information communicated from the orphaned meter to identify with which customer account the orphaned meter should be linked. In this way, the system identifies and recovers orphaned meters.

Figure 1:
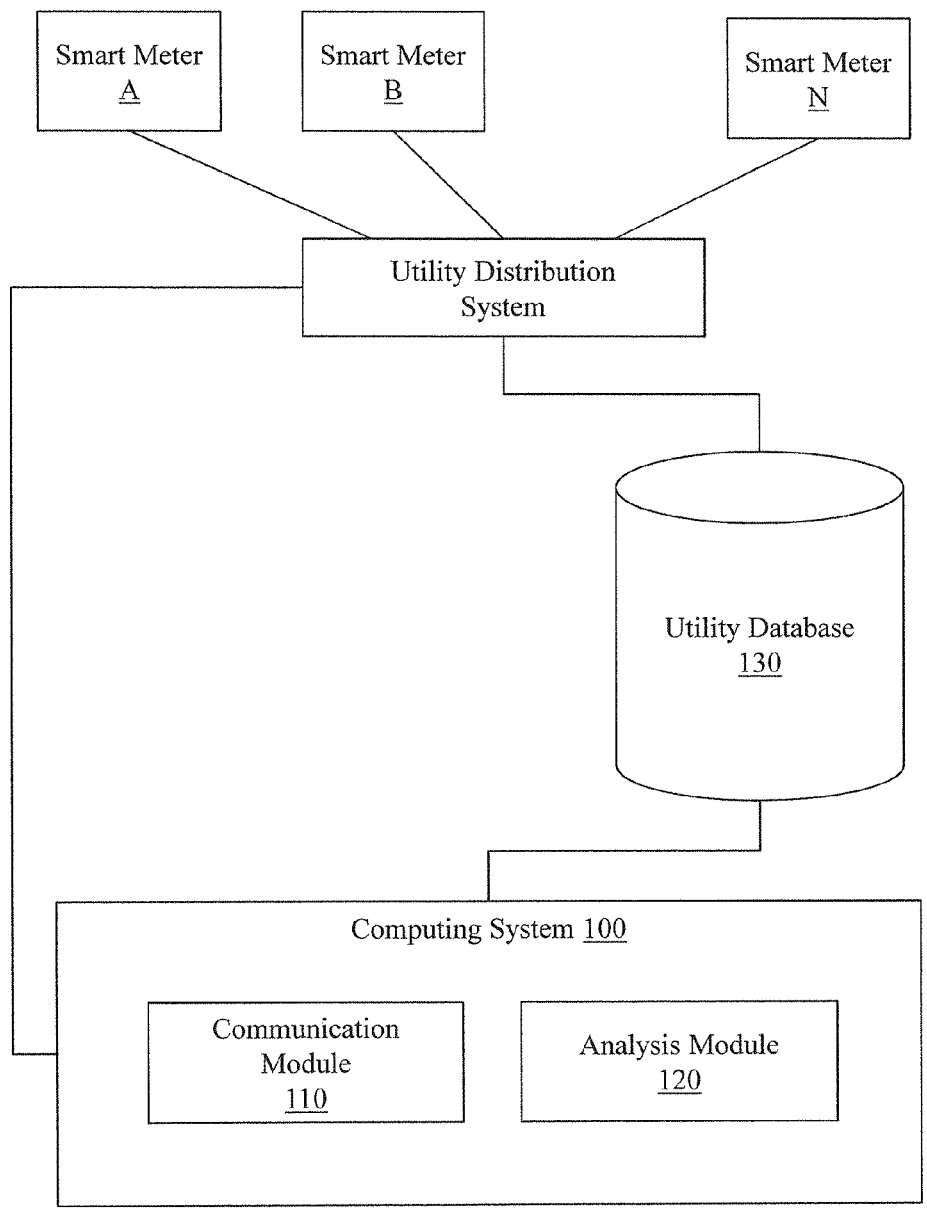
FIG. 1 illustrates one embodiment of a system associated with identifying orphaned utility meters in a utility distribution system.

With reference to FIG. 1, one embodiment of a computing system 100 associated with identifying orphaned meters is illustrated. In one embodiment, the computing system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment, the system 100 is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with instructions that when executed by at least a processor cause the computing device to perform the corresponding function(s).

In either case, the system 100 includes a communication module 110 and an analysis module 120. In general, the system 100 is configured to recover orphaned meters by analyzing electronic records from a utility database 130. The electronic records are, for example, electronic data structures that store information regarding characteristics of utility meters and customer accounts for the utility company. In one embodiment, customer account information may include customer names, an address of service, an account number, utility meter identifying information, and so on.

Additionally, in one embodiment, the system 100 manages a connectivity model stored in an electronic data structure, such as a graph, tree, or a similar data structure in the utility database 130. The connectivity model includes information about connections between elements in a utility distribution grid. For example, the connectivity model includes information about connections for each utility meter, connections between upstream components and so on.

In one embodiment, the connectivity model also includes information/properties about different components in the utility distribution grid and may describe other properties of the utility distribution grid. For example, the connectivity model may include information about each utility meter that specifies an installation date, a geographic location (e.g., GPS coordinates), current status, historical status, historic record of power outages for the utility meter, address of a premise at which the utility meter is located, an associated customer account number, and so on.

It should be appreciated that a utility distribution grid is a physical network of the utility company. Accordingly, the utility distribution grid includes many different distribution components. In the instance of an electric utility, the different components, for example, wires/cables, pipes, connect a power generation station to substations, to transformers, and down to meters at each location of service (e.g., residential location) to provide electricity. Similarly, other utility providers (e.g., water, gas, etc.) also use utility distribution grids with utility meters at each end point to meter consumption.

For purposes of this discussion, the utility meters are smart meters A, B through N that are connected to a utility distribution grid (e.g., electric). The smart meters are configured to monitor and log data about conditions of utility resource usage. In one embodiment, the meters can provide collected information about usage on-demand via network messages to the computing system 100 or another system that is accessible by the computing system 100. Accordingly, the meters may provide continuous data, data at some predefined interval, or data when requested. In either case, the information may be provided from the meters at a rate which is most relevant to a particular implementation.

Furthermore, communications from the meters may be referred to as "pings" or "ping communications" because the communications may act as a heartbeat communication to ping the utility company. The communications may be electronically transmitted from each utility meter via a mesh communication network, a cellular communication network or another communication method depending on the particular implementation.

Furthermore, the communications may include information. In one embodiment, the ping communications include at least a date of when the utility meter was installed. Additionally, the communications may also include an identifier of the utility meter, consumption information, location information (e.g., GPS coordinates) and so on. In either case, the utility meters are capable of providing electronic communications back to the computing system 100 along with ping information.

In one embodiment, the communication module 110 is configured to receive the electronic communications from meters in the utility distribution grid. While the communication module 110 is discussed as receiving the electronic communications, of course, the communication module 110 may either directly receive the communications or may indirectly receive the communication by retrieving information from the communications that is stored in the utility database 130.

Furthermore, in one embodiment, the communication module 110 may receive an input that selects a particular orphaned meter or set of orphaned meters for analysis. In this example, the communication module 110 automatically retrieves, for example, a most recent electronic communication from the orphaned meter out of the utility database 130. Alternatively, upon receiving an electronic communication from the orphaned meter, the communication module 110 may automatically induce analysis to determine an actual location and associated customer account. In this way, the communication module 110 receives communications from orphaned meters.

In either case, the communication module 110 is configured to identify an approximate/potential location of the orphaned meter from the electronic communication. That is, to begin analysis of the orphaned meter, the system 100 uses a location of the orphaned meter to select relevant candidate meters. Accordingly, the communication module 110 is configured to determine the general location (not the premise) of the orphaned meter. In one embodiment, the communication module 110 simply retrieves GPS coordinates or other location information from the ping information that is provided along with the electronic communication. Alternatively, the communication module 110 triangulates a location of the orphaned meter from copies of the communication received at different communication towers (e.g., cell towers).

Once a location of the orphaned meter is, for example, at least approximately known, the analysis module 120 selects candidate meters from the utility database 130. Further details about selecting the candidate meters will be discussed in relation to FIG. 2. However, the candidate meters are, generally, utility meters that are located closely to the approximate location of the orphaned meter. In this way, the analysis may be directed to a pool of candidates that are most likely to include the orphaned meter.

Subsequently, the analysis module 120 attempts to correlate information retrieved from the utility database 130 about the candidate meters with information known about the orphaned meter in order to characterize each of the candidate meters in relation to the orphaned meter. In one embodiment, the analysis module 120 generates a set of comparative metrics for each of the candidate meters. The comparative metrics will be discussed in greater detail subsequently, but, in general, it should be understood that the comparative metrics quantize similarities between each candidate meter and the orphaned meter to determine how well the two meters correlate.

Thus, using the comparative metrics, and, for example, an historical record of comparative metrics for successfully recovered orphaned meters, the analysis module 120, in one embodiment, calculates a match likelihood that indicates how likely each candidate meter is the orphaned meter. According to the calculated match likelihood, the analysis module 120 generates electronic data results of likely matches to be used by the utility company for further investigation. In this way, the system 100 identifies and directs the utility company to candidate meters that are likely the orphaned meter. Once identified, the electronic record or customer record associated with the orphaned meter is reconfigured with correct information to link the meter to the record. In one manner, the present system improves the manual process of searching and surveying for orphaned meters and makes the process more efficient and reliable.

Figure 2:
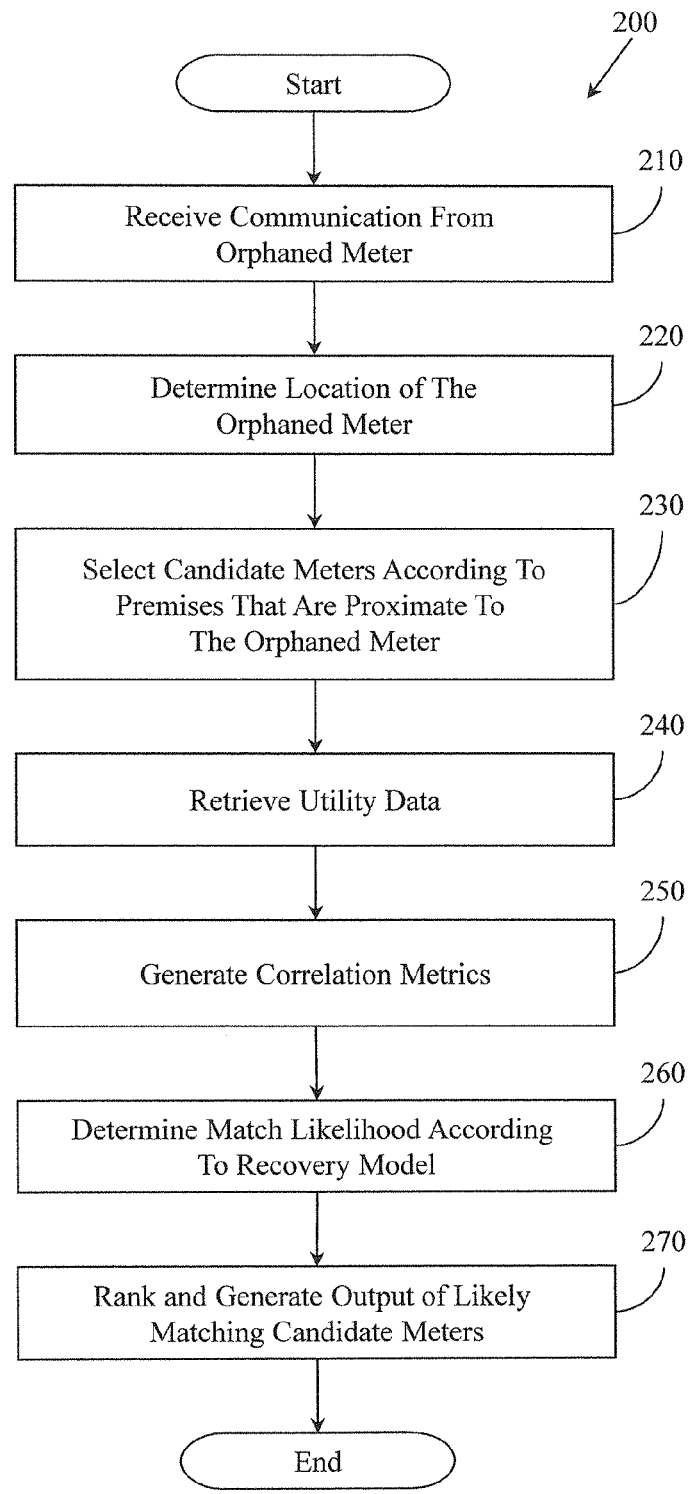
FIG. 2 illustrates one embodiment of a method associated with analyzing candidate meters to identify orphaned meters.

Further details of analyzing the information of the utility database 130 and the communications to recover orphaned meters will be discussed in relation to FIG. 2. FIG. 2 illustrates a computer-implemented method 200 associated with identifying an orphaned meter from a plurality of candidate meters. Method 200 is performed by a computing device since method 200 operates to alter/transform and create electronic data within an electronic data structure, which cannot be performed manually or mentally by a human. Thus, method 200 will be discussed from the perspective of a computing device similar to the computing system 100 of FIG. 1. In one embodiment, all actions of FIG. 2 are performed by the computing device configured with a programmed algorithm to perform the method. However, it should be appreciated that the method 200 may be performed by computing systems that may be configured differently than the system 100 of FIG. 1. No actions of method 200 are performed mentally or manually by a human.

At 210, an electronic communication is received from an orphaned meter by, for example, a network interface and receiver. The electronic communication is, for example, a ping (e.g., electronic message/signal) from the orphaned meter intended for the utility company that provides ping information to the utility company. In general, utility meters (e.g., smart meters) for the utility company provide the ping in order to convey the ping information and a viability of the meter to the utility company. In one embodiment, the ping information includes a status of the utility meter, consumption information, an identifier of the utility meter, an installation date of the utility meter, location information, and so on.

In either case, the orphaned meter provides the communication in a similar manner as other utility meters of the utility company. However, because an electronic record that is supposed to be linked with the orphaned meter is misconfigured and unknown, the utility company receives the communication from the orphaned meter but does not know to which customer account the provided information belongs. In one embodiment, since a matching record associated with the meter is not found in the database, the system identifies the meter as an orphan after receiving the communication.

At 220, a location of the orphaned meter is determined. In one embodiment, the location is determined from information in the electronic communication. That is, the ping may be configured upon installation of the orphaned meter with GPS coordinates or other location specifying data. Thus, the computing system (e.g., via a program module with stored instructions) parses the electronic communication and identifies location information within the electronic communication to obtain a programmed location of the meter.

Alternatively, the electronic communication may not include location information. Instead, a general location of the orphaned meter may be determined by using coordinates of a communication device that received the electronic communication or by using triangulation techniques. That is, in an instance where the ping is a wireless communication that is received by multiple communications receivers (e.g., cell towers), a target location of the orphaned meter can be triangulated according to different signal characteristics of the communication itself. In this way, a general location of the orphaned meter can be determined when precise coordinates are not available.

At 230, candidate meters are selected from the electronic database. In general, the candidate meters are selected according to a proximity to the location determined at 220. For example, the computing system searches the electronic database to identify electronic records of meters that have a matching location or a location within a threshold distance of the target location (e.g., within a block, or street or less). In one embodiment, the candidate meters that are located proximate to the orphaned meter are identified from the electronic records and selected in order to direct an analysis at utility meters that are most likely the orphaned meter.

For example, utility meters from a predefined number of premises (e.g., physical addresses of homes, apartments, buildings, etc.) are selected. The predefined number of premises (e.g., 50) are the premises closest to the location of the orphaned meter as determined at 220. Thus, meters from the premises are included with increasing distance until the predefined number of premises is achieved. Of course, because the candidate meters included in the sample are determined according to premise and not individual meter, a number of meters in the sample may vary.

Furthermore, it should be appreciated that the candidate meters are generally utility meters that are associated with customer accounts of the utility company. That is, the candidate meters, while possibly not actually in service, are utility meters that are, nevertheless, associated with a customer account and premise (i.e., physical address). Thus, selecting a pool of candidate meters is intended to encompass possible premises at which the orphaned meter is actually located, but for which another meter is linked to the associated customer account in error.

Once the candidate meters are determined at 230, at 240, information about the candidate meters is retrieved from an electronic utility database of the utility company from electronic records that are associated with or match the candidate meters. In one embodiment, retrieving data from the electronic database for the candidate meters includes retrieving general characteristics for each of the candidate meters that is subsequently used to evaluate the candidates. Thus, retrieving the data may include accessing and retrieving information from customer accounts, utility meter service records, utility meter tracking records, and so on.

At 250, evaluation of the data retrieved, at 240, begins by generating comparative metrics for each of the candidate meters. In general, the comparative metrics are used to relate the orphaned meter to each of the candidate meters. That is, the comparative metrics define differences/similarities between the candidate meters and the orphaned meter. Thus, to generate the comparative metrics, the ping information may be compared to characteristics for each of the plurality of candidate meters.

In one embodiment, the comparative metrics include several different metrics (e.g., 3, 7, or more). One example of a comparative metric includes a difference in days between installation of the orphaned meter and a most recent communication from the candidate meter. This metric facilitates identifying circumstances where the orphaned meter replaced another meter. Consider that replacing an old meter with the orphaned meter would result in the old meter no longer communicating because it has been removed from the network/grid and replaced by the orphaned meter. Thus, in one embodiment, the number of days between installation of the orphaned meter and communication with the old meter should be close.

However, if the electronic records have been mis-configured, then the old meter may still be linked to the records but is not communicating. Thus, determining a difference between installation and a most recent communication may provide a significant indication of whether the candidate meter is the orphaned meter. That is, the metric may indicate that the candidate is linked to the customer account instead of the orphaned meter.

Continuing with the comparative metrics, another example metric is determined by comparing geographic distance between locations of the candidate and the orphaned meters. Clearly, if the orphaned meter is the candidate meter then a very close relationship would be expected in geographic location. Thus, the location metric provides an indication of how close the meters are geographically. While it would be generally expected that the locations would be similar, of course, circumstances do exist where the orphaned meter could be installed at a new location on a premise that is a significant distance from an old meter (i.e., candidate meter) or a location is not accurately reported. Thus, the location metric itself is not necessarily determinative.

Another comparative metric may include a number of power outages for a candidate meter around a date of installation of the orphaned meter. In this example, power outages may be expected to closely correlate because of work being doing to swap the meters that requires power to be disconnected from both at very similar times.

Gap rate may also be used as a comparative metric. In general, gap rate refers to a rate of failed reports for a meter. That is, the gap rate specifies how often or when a meter fails to provide a ping communication. The gap rate may be selected for any particular time period. In one embodiment, a comparative metric for gap rates is used from a time since the orphaned meter has been installed, while another comparative metric is used with a gap rate taken from before when the orphaned meter was installed.

Lastly, a reported status of a meter may also be used as a comparative metric. That is, a status of a utility meter at any given time can be used to correlate the meters. The status of a meter may indicate different states, such as, active, inactive, disconnected, removed, etc. In general, as with the gap rate, meter status is available as a historical record as provided from communications received from the meters. Thus, in one embodiment, one comparative metric indicates a status of the candidate at an install time of the orphaned meter while a second comparative metric indicates a current status of the candidate meter.

For example, the status of a candidate meter that closely correlates may presently indicate offline while a status at installation of the orphan may be online or another operational status. In another instance, the status of a candidate meter that closely correlates may be active before and after the date of installation. Of course, depending on particular circumstances these values may vary while still correlating.

Thus, at 260, the comparative metrics are further evaluated to produce a match likelihood for each candidate. The match likelihood is, for example, a percentage probability/likelihood that a respective candidate meter matches the orphaned meter as determined according to a statistical model (i.e., the recovery model). More specifically, the match likelihood indicates a likelihood that a customer account associated with the candidate meter should be associated with the orphaned meter and the candidate meter is no longer actually in service.

In one embodiment, the match likelihood for each candidate meter is determined according to a recovery model. That is, the comparative metric is translated/transformed into the match likelihood according to the recovery model. The recovery model is a statistical model that is a function of comparative metrics from historical matches between orphaned meters and candidate meters.

That is, the recovery model is trained using comparative metrics from previously matching candidate meters and orphaned meters. The comparative metrics from these matches are used to model what matching comparative metrics generally trend toward. Thus, the recovery model, in one embodiment, assigns different weights to the comparative metrics according to how well individual metrics historically identify matches.

As an example, the location metric may be a significant indicator of a match that often closely correlates as shown by the recovery model from historical matches. Accordingly, in one embodiment, the recovery model weighs the location comparative metric more so than the other comparative metrics. In this way, historical trends in the comparative metrics between matches are used to improve calculation of the match likelihood.

The recovery model may be implemented in several different forms. In one embodiment, the recovery model is a gradient boosting classifier that produces the match likelihoods as a prediction of a match based, at least in part, on the comparative metrics and historical information from previously confirmed matches.

Additionally, upon each confirmed match, the recovery model, in one embodiment, is retrained to account for the comparative metrics associated with the new match. In one embodiment, the recovery model is a gradient boosting classifier or logistic regression that is configured to be dynamically updated to account for new training data. In this way, the recovery model dynamically learns trends in the comparative metrics for matches by electronically transforming the recovery model with each new confirmed match.

At 270, the candidate meters are ranked according to the match likelihoods determined at 260. After the candidate meters have been ranked (i.e., sorted), a predetermined number of the candidate meters may be provided as output. For example, the computing system generates an electronic output based on the evaluation results with the top five matches. The electronic output is displayed on a display screen and/or transmitted in an electronic communication to an administrator of the utility company so that the associated candidate meters may be further inspected to identify and recover the orphaned meter. The generated electronic output identifies a limited and targeted number of the candidate meters, which in some cases is one direct matching meter. Thus, this reduces the amount of time, effort, and resources needed to manually search large physical areas that have many installed meters in order to find the orphaned meter.

In one embodiment, candidate meters are provided as output only when a match likelihood satisfies a predetermined threshold. For example, the predetermined threshold may indicate that a candidate meter is provided as output upon satisfying a predictive probability of at least a 90% match likelihood. Of course, while 90% is provided as an example, the recovery model may specify a threshold as determined from historic matches or another threshold may be specified according to a manual input.

In either case, candidate meters that likely match the orphaned meter are electronically communicated or otherwise electronically indicated within the utility database 130 so that additional investigation of the candidates and confirmation of a match can be made.

Alternatively, in one embodiment, a candidate meter that most closely correlates is provided as a result. Information associated with the matching meter (e.g., customer account information) may then be used to transform an electronic record associated with a customer account by, for example, automatically linking the orphaned meter to the customer account instead of matching meter that is currently associated with the customer account. In this way, an incorrectly configured electronic record that caused the orphaned meter to be lost may be automatically corrected.

Computing Device Embodiment

Figure 3:
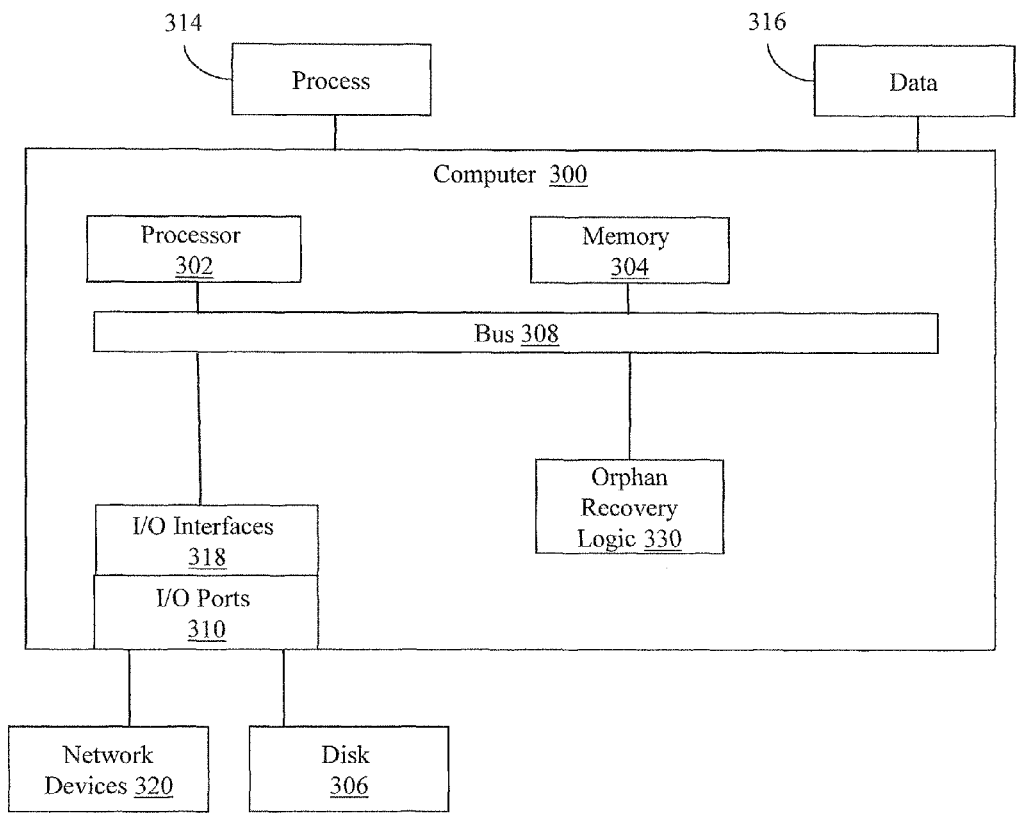
FIG. 3 illustrates an embodiment of a computing system configured with the example systems and/or methods disclosed.

FIG. 3 illustrates an example computing device that is configured and/or programmed with one or more of the example systems and methods described herein, and/or equivalents. The example computing device may be a computer 300 that includes a processor 302, a memory 304, and input/output ports 310 operably connected by a bus 308. In one example, the computer 300 may include orphan recovery logic 330 configured to facilitate identification of orphaned meters by analyzing utility meter information similar system 100 shown in FIG. 1. In different examples, the orphan recovery logic 330 may be implemented in hardware, a non-transitory computer-readable medium with stored instructions, firmware, and/or combinations thereof. While the orphan recovery logic 330 is illustrated as a hardware component attached to the bus 308, it is to be appreciated that in other embodiments, the orphan recovery logic 330 could be implemented in the processor 302, stored in memory 304, or stored in disk 306.

In one embodiment, orphan recovery logic 330 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to select candidate meters and evaluate the candidate meters according to a recovery model. The means may also be implemented as stored computer executable instructions that are presented to computer 300 as data 316 that are temporarily stored in memory 304 and then executed by processor 302.

Generally describing an example configuration of the computer 300, the processor 302 may be a variety of various processors including dual microprocessor and other multi-processor architectures. A memory 304 may include volatile memory and/or non-volatile memory. Non-volatile memory may include, for example, ROM, PROM, and so on. Volatile memory may include, for example, RAM, SRAM, DRAM, and so on.

A storage disk 306 may be operably connected to the computer 300 via, for example, an input/output interface (e.g., card, device) 318 and an input/output port 310. The disk 306 may be, for example, a magnetic disk drive, a solid state disk drive, a floppy disk drive, a tape drive, a Zip drive, a flash memory card, a memory stick, and so on. Furthermore, the disk 306 may be a CD-ROM drive, a CD-R drive, a CD-RW drive, a DVD ROM, and so on. The memory 304 can store a process 314 and/or a data 316, for example. The disk 306 and/or the memory 304 can store an operating system that controls and allocates resources of the computer 300.

The computer 300 may interact with input/output devices via the i/o interfaces 318 and the input/output ports 310. Input/output devices may be, for example, a keyboard, a microphone, a pointing and selection device, cameras, video cards, displays, the disk 306, the network devices 320, and so on. The input/output ports 310 may include, for example, serial ports, parallel ports, and USB ports.

The computer 300 can operate in a network environment and thus may be connected to the network devices 320 via the i/o interfaces 318, and/or the i/o ports 310. Through the network devices 320, the computer 300 may interact with a network. Through the network, the computer 300 may be logically connected to remote computers. Networks with which the computer 300 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer communication," as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium," as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic," as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

"User," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a computer cause the computer to perform functions, the instructions comprising instructions configured for:
   receiving, over a communications network, an electronic communication from an orphaned meter, wherein the orphaned meter is a utility meter that is actively transmitting ping information to a utility company and is not associated with a customer account;
   selecting, from an electronic database, a plurality of candidate meters that are located proximate to the orphaned meter as determined based, at least in part, on the ping information, wherein the plurality of candidate meters are utility meters that are associated with customer accounts of the utility company;
   evaluating, by at least a processor, the plurality of candidate meters according to at least the ping information to correlate the plurality of candidate meters with the orphaned meter; and
   generating an electronic output that identifies which of the plurality of candidate meters correlate with the orphaned meter to reduce time searching for the orphaned meter.

2. The non-transitory computer-readable medium of claim 1, wherein the instructions for evaluating the plurality of candidate meters include instructions for generating comparative metrics for each of the plurality of candidate meters by comparing the ping information to characteristics for each of the plurality of candidate meters, and wherein the comparative metrics define similarities between the ping information and the characteristics of each of the plurality of candidate meters.

3. The non-transitory computer-readable medium of claim 2, wherein the instructions for generating the comparative metrics for each of the plurality of candidate meters include instructions for determining:

a number of days between installation of the orphaned meter and a date of a most recent communication from a respective meter of the plurality of candidate meters, a geographic distance between a location of the orphaned meter and a location of the respective meter of the plurality of candidate meters, a number of power outages for the respective meter of the plurality of candidate meters around a date of installation of the orphaned meter, a current gap rate for the respective meter of the plurality of candidate meters that indicates a rate of failed reports since when the orphaned meter was installed, a prior gap rate for the respective meter of the plurality of candidate meters that indicates a rate of failed reports from before when the orphaned meter was installed, a status of the respective meter of the plurality of candidate meters at the date of installation of the orphaned meter, and a current status of the respective meter of the plurality of candidate meters at a present time.

4. The non-transitory computer-readable medium of claim 2, wherein the instructions evaluating the plurality of candidate meters include instructions for translating the comparative metric according to a recovery model for a respective meter of the plurality of candidate meters into a match likelihood that indicates how closely the respective meter of the plurality of candidate meters correlates with the orphaned meter, wherein the recovery model is a statistical model that is a function of the comparative metrics from historical matches between orphaned meters and candidate meters.

5. The non-transitory computer-readable medium of claim 4, wherein the recovery model indicates weighting factors for the comparative metrics according to established historical comparisons between respective metrics of the comparative metrics and matching orphaned meters and candidate meters.

6. The non-transitory computer-readable medium of claim 1, wherein the instructions for selecting the plurality of candidate meters include instructions for selecting electronic records from the electronic database that correlate with utility meters at premises that are geographically proximate to the orphaned meter, and wherein selecting the plurality of candidate meters includes determining an approximate location from the ping information to identify premises geographically proximate to the orphaned meter.

7. The non-transitory computer-readable medium of claim 1, further comprising instructions for determining a potential location of the orphaned meter according to the electronic communication by retrieving global positioning system (GPS) coordinates that are part of the electronic communication.

8. The non-transitory computer-readable medium of claim 1, further comprising instructions for transforming an electronic record associated with an identified meter of the plurality of candidate meters that matches the orphaned meter by changing the electronic record to indicate the orphaned meter is installed instead of the identified meter.

9. The non-transitory computer-readable medium of claim 1, wherein the ping information includes at least a date of installation of the orphaned meter, and wherein the electronic communication is a ping communication that is received from the orphaned meter at regular intervals.

10. A computing system, comprising:
a communication module stored in a non-transitory computer readable medium and configured with instructions for receiving an electronic communication from an orphaned meter, wherein the orphaned meter is a utility meter that is actively transmitting ping information to a utility company and is not associated with a customer account;

an analysis module stored in the non-transitory computer readable medium and configured with instructions for selecting, from an electronic database, a plurality of candidate meters that are located proximate to the orphaned meter as determined based, at least in part, on the ping information, wherein the plurality of candidate meters are utility meters that are associated with customer accounts of the utility company, wherein the analysis module further includes instructions for evaluating the plurality of candidate meters according to at least the ping information to correlate the plurality of candidate meters with the orphaned meter, and wherein the analysis module further includes instructions for generating an electronic output that identifies which of the plurality of candidate meters correlate with the orphaned meter to reduce time searching for the orphaned meter.

11. The computing system of claim 10, wherein evaluating the plurality of candidate meters includes generating comparative metrics for each of the plurality of candidate meters by comparing the ping information to characteristics for each of the plurality of candidate meters, and wherein the comparative metrics define similarities between the ping information and the characteristics of each of the plurality of candidate meters.

12. The computing system of claim 11, wherein evaluating the plurality of candidate meters includes using a recovery model to translate the comparative metric for a respective meter of the plurality of candidate meters into a match likelihood that indicates how closely the respective meter of the plurality of candidate meters correlates with the orphaned meter, wherein the recovery model is a statistical model that is a function of comparative metrics from historical matches between orphaned meters and candidate meters, and wherein the recovery model indicates weighting factors for the comparative metrics according to established historical relationships between respective metrics of the comparative metrics and matching orphaned meters and candidate meters.

13. The computing system of claim 10, wherein selecting the plurality of candidate meters includes selecting electronic records from the electronic database that correlate with utility meters at premises that are geographically proximate to the orphaned meter, and wherein selecting the plurality of candidate meters includes determining a potential location from global positioning system (GPS) coordinates provided as part of the ping information.

14. The computing system of claim 10, wherein the ping information includes at least a date of installation of the orphaned meter, and wherein the electronic communication is a ping communication that is received from the orphaned meter at regular intervals.

15. The computing system of claim 11, wherein generating the comparative metrics for each of the plurality of candidate meters includes determining:

a number of days between installation of the orphaned meter and a date of a most recent communication from a respective meter of the plurality of candidate meters, and a geographic distance between an approximate location of the orphaned meter and a location of the respective meter of the plurality of candidate meters.

16. The computing system of claim 11, wherein generating the comparative metrics for each of the plurality of candidate meters includes determining:
- a number of power outages for a respective meter of the plurality of candidate meters around a date of installation of the orphaned meter,
- a current gap rate for the respective meter of the plurality of candidate meters that indicates a rate of failed reports since when the orphaned meter was installed,
- a prior gap rate for the respective meter of the plurality of candidate that indicates a rate of failed reports from before when the orphaned meter was installed,
- an install status of the respective meter of the plurality of candidate meters at the date of installation of the orphaned meter, and
- a current status of the respective meter of the plurality of candidate meters at a present time.

17. A computer-implemented method, the method comprising:
- selecting, from an electronic database, a plurality of candidate meters that are located proximate to an orphaned meter as determined based, at least in part, on ping information received from the orphaned meter, wherein the orphaned meter is a utility meter that is actively transmitting the ping information to a utility company and is not associated with a customer account;
- evaluating the plurality of candidate meters according to the ping information to generate comparative metrics that define similarities between the orphaned meter and each of the plurality of candidate meters to identify whether one or more of the plurality of candidate meters correlate with the orphaned meter; and
- generating an electronic output based, at least in part, on the comparative metrics that identifies the one or more of the plurality of candidate meters that correlate with the orphaned meter to reduce time of searching for the orphaned meter.

18. The computer-implemented method of claim 17, wherein evaluating the plurality of candidate meters includes translating the comparative metrics according to a recovery model into a match likelihood for a respective meter of the plurality of candidate meters that indicates how closely the respective meter of the plurality of candidate meters correlates with the orphaned meter, wherein the recovery model indicates weighting factors for the comparative metrics according to established historical relationships between respective metrics of the comparative metrics and matching orphaned meters and candidate meters.

19. The computer-implemented method of claim 17, wherein the plurality of candidate meters are utility meters that are associated with customer accounts of the utility company that are proximate to a location of the orphaned meter, and wherein the ping information includes a geographic location of the orphaned meter and an installation date of the orphaned meter.

20. The computer-implemented method of claim 17, wherein generating the comparative metrics for each of the plurality of candidate meters includes determining:
- a number of days between installation of the orphaned meter and a date of a most recent communication from a respective meter of the plurality of candidate meters, and
- a geographic distance between an approximate location of the orphaned meter and a location of a respective meter of plurality of candidate meters.

* * * * *